United States Patent
Van Zundert et al.

(10) Patent No.: US 7,525,261 B2
(45) Date of Patent: Apr. 28, 2009

(54) CIRCUIT ARRANGEMENT FOR OPERATING A HIGH PRESSURE DISCHARGE LAMP

(75) Inventors: Roy Hendrik Anna Maria Van Zundert, Eindhoven (NL); Thijs Oosterbaan, Eindhoven (NL); Dolf Henricus Jozef Van Casteren, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 787 days.

(21) Appl. No.: 10/534,318

(22) PCT Filed: Nov. 6, 2003

(86) PCT No.: PCT/IB03/50015

§ 371 (c)(1),
(2), (4) Date: May 9, 2005

(87) PCT Pub. No.: WO2004/045255

PCT Pub. Date: May 27, 2004

(65) Prior Publication Data

US 2006/0108998 A1 May 25, 2006

(30) Foreign Application Priority Data

Nov. 11, 2002 (EP) .................................. 02079686

(51) Int. Cl.
*H05B 37/02* (2006.01)

(52) U.S. Cl. .................... 315/307; 315/209 R; 315/360

(58) Field of Classification Search ............. 315/209 R, 315/224, 225, 247, 283, 289, 291, 307, 360
See application file for complete search history.

(56) References Cited

U.S. PATENT DOCUMENTS

| | | | | |
|---|---|---|---|---|
| 3,913,002 | A | * 10/1975 | Steigerwald et al. | .......... 363/18 |
| 4,210,846 | A | * 7/1980 | Capewell et al. | ............. 315/121 |
| 5,723,953 | A | * 3/1998 | Nerone et al. | ............... 315/307 |
| 5,883,473 | A | * 3/1999 | Li et al. | ...................... 315/225 |
| 6,188,183 | B1 | * 2/2001 | Greenwood et al. | ......... 315/307 |
| 6,316,887 | B1 | * 11/2001 | Ribarich et al. | ............. 315/307 |

* cited by examiner

*Primary Examiner*—David Hung Vu
*Assistant Examiner*—Tung X Le

(57) ABSTRACT

A circuit arrangement for operating a high pressure discharge lamp comprises a down converter equipped with an output capacitor and a commutator equipped with lamp connection terminals. The amplitude of the DC current generated by the down converter is controlled by means of a control loop. Commutation of the DC current causes a periodical voltage to be present across the output capacitor. This periodical voltage can be an overshoot voltage and/or a voltage caused by resonance of the lamp with the output capacitor. To suppress the periodical voltage, the reference signal of the current control loop is adjusted in dependency of the amplitude of the periodical voltage.

10 Claims, 3 Drawing Sheets

CIRCUIT ARRANGEMENT FOR OPERATING A HIGH PRESSURE DISCHARGE LAMP

Figure 1:
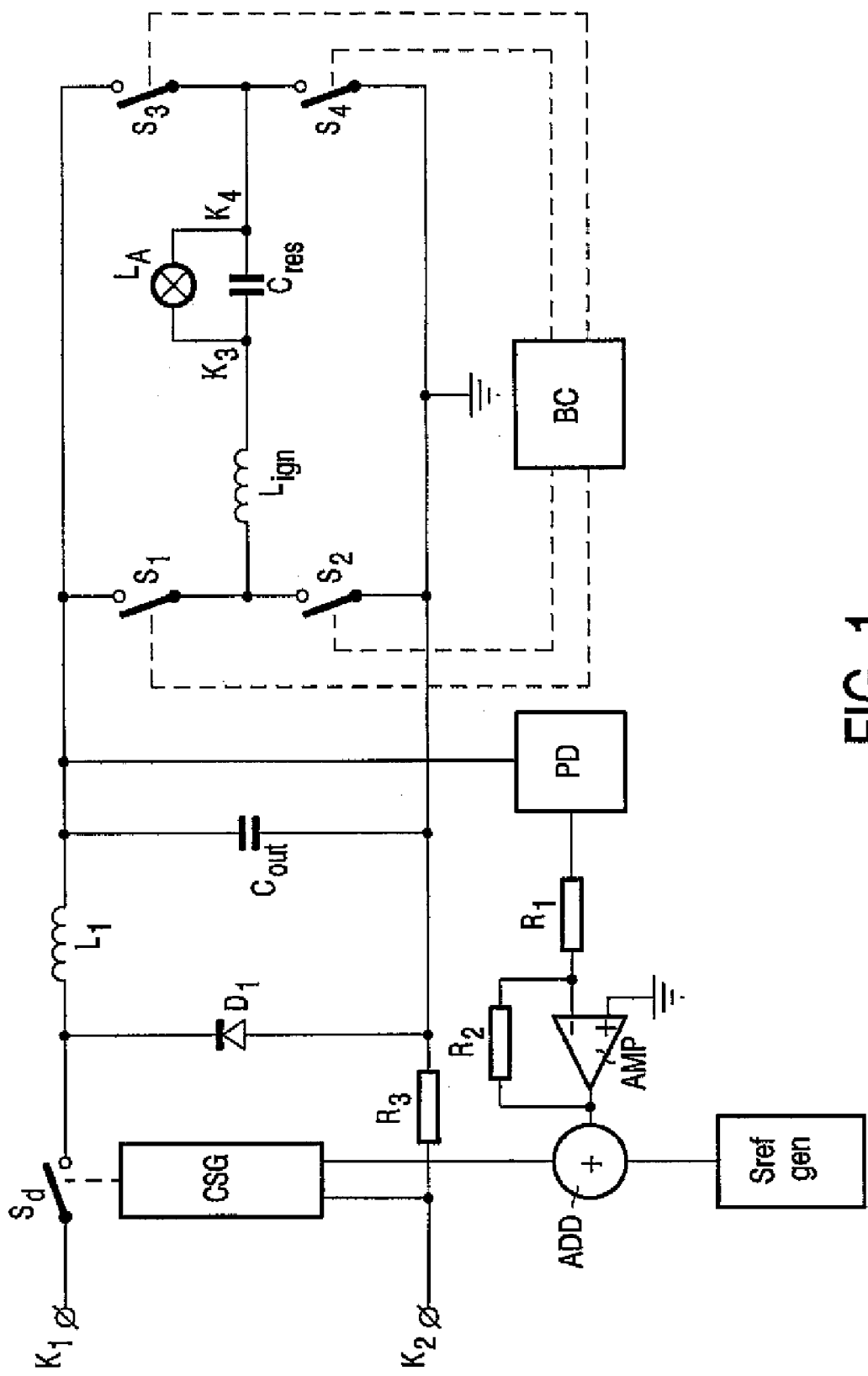

The invention relates to a circuit arrangement for operating a high pressure discharge lamp comprising
  input terminals for connection to a supply voltage source,
  a DC-DC-converter coupled to the input terminals for generating a DC current out of a supply voltage supplied by the supply voltage source and comprising
  a control loop for controlling the DC current at a value that is represented by a reference signal Sref,
  a control circuit for adjusting the reference signal Sref, and an output capacitor,
  a commutator for commutating the DC current and comprising lamp connection terminals.

Such a circuit arrangement is known and is for instance often used to operate ultra high pressure lamps in projection equipment. In practice the commutator often comprises a full bridge circuit and the frequency of commutation often is in the order of magnitude of 10 Hz or 100 Hz. Between two subsequent commutations the DC current is controlled at a constant value represented by the reference value Sref for most of the time. As a consequence the current through the high pressure discharge lamp is a low frequency substantially square wave shaped AC current. It has been found that the high pressure discharge lamp can be operated in a stable and efficient way by means of such a current. Several problems are associated with the commutation of the DC current. For a short time lapse during the commutation all the switching elements comprised in the bridge circuit are non-conductive, so that no current is supplied to the bridge circuit by the DC-DC-converter. As a consequence the voltage across the output capacitor increases during this short time lapse. This increase in voltage across the output capacitor causes an increase in lamp current directly after the commutation. This increase in lamp current is undesirable since it causes the lamp to temporarily generate more light so that the light output is not substantially constant.

In practice this temporary increase in the voltage across the capacitor, commonly referred to as "overshoot", is often counteracted by temporarily decreasing the value of Sref in the direct vicinity of a commutation. The decrease in Sref often referred to as "dip", causes the DC-current to temporarily have a comparatively low value during a small time lapse. As a result the overshoot caused by the commutation is suppressed to a large extent. The dip can be considered as a modulation of the reference signal Sref that is taking place with the same frequency as the commutation of the DC-current. The "dip" is characterized by dip parameters such as $\Delta$Sref (the depth of the dip), the time lapse during which Sref is maintained at the decreased level, the rate at which Sref is decreased at the beginning of the dip, the rate at which Sref is increased at the end of the dip and the phase relation between the modulated signal Sref and the lamp current. It has been found that different types of high pressure lamps require a different setting of the dip parameters in order to obtain a maximal suppression of the overshoot. Similarly, it has also been found that high pressure discharge lamps of the same type but with a different "age" (=number of hours that the lamp has burned), require a different setting of the dip parameters for an optimal suppression of the overshoot. As a consequence the overshoot suppression implemented in the known circuit arrangements is only optimized for one particular lamp type and even only for one particular age of that lamp.

Another problem associated with the commutation of the DC current is that it effects a substantially stepwise change in the load of the circuit arrangement. This stepwise change in the load of the circuit arrangement causes the down converter output capacitor to resonate with components included in the commutator such as an ignition choke and/or with the lamp. Consequently an AC-current of compatively high frequency is superimposed on the lamp current and an AC voltage of identical frequency is superimposed on the voltage across the output capacitor. This resonance in turn often causes audible noise and influences the light output of the lamp. Furthermore this resonance can damage the lamp.

The invention aims to provide a circuit arrangement for operating a high pressure discharge lamp in which the problems associated with the commutation of the DC-current are effectively counteracted for many different types of high pressure discharge lamps during their complete life time.

A circuit arrangement as mentioned in the opening paragraph is therefore according to the invention characterized in that the control circuit comprises means for adjusting the reference signal Sref in dependency of the amplitude of a periodical voltage that is present across the output capacitor and is caused by the commutation of the DC current.

In a circuit arrangement according to the invention the signal Sref is adjusted in dependency of the amplitude of the periodical voltage that is present across the output capacitor and is caused by the commutation of the DC-current. This periodical voltage can be the overshoot voltage but can also be the an AC voltage caused by resonance between the output capacitor of the DC-DC-converter on the one hand and (a) component(s) of the commutator and/or the high pressure discharge lamp on the other hand. The adjustment of Sref in dependency of the periodical voltage present across the output capacitor results in an effective suppression of these periodical voltages. It has been found that in a circuit arrangement according to the invention the periodic voltage across the output capacitor is effectively suppressed for many different types of high pressure discharge lamps. It has also been found that this effective suppression was maintained during the whole life time of the lamp.

In a first preferred embodiment of a circuit arrangement according to the invention, the control circuit comprises circuitry for generating a signal Scorr that represents the momentary amplitude of the AC voltage across the output capacitor and circuitry for subtracting the signal Scorr from the reference signal Sref. The control circuit in this first preferred embodiment is comparatively simple and can also be implemented in a comparatively simple way. The circuitry for generating the signal Scorr may comprise a filter that passes a frequency band around the frequency of the resonance.

Good results have been obtained for embodiments of a circuit arrangement according to the invention, wherein the signal Scorr is proportional to the momentary amplitude of the AC voltage across the output capacitor. When a high pressure discharge lamp ages, its impedance changes. It has been found that a very effective suppression of the AC voltage is obtained, in case the circuit arrangement is equipped with circuitry for adjusting the ratio between the signal Scorr and the amplitude of the AC voltage across the output capacitor in dependency of the age of the lamp. More in particular the ratio between the signal Scorr and the momentary amplitude of the AC voltage across the output capacitor is decreased when the lamp ages. To this end the circuit arrangement could comprise a timer for measuring the number of hours during which the lamp burns and means for adjusting the ratio between the signal Scorr and the amplitude of the AC voltage in dependency of is number of hours. It has been found, however, that a very simple and effective implementation can be realized by adjusting the ratio between the signal Scorr and the momentary amplitude of the AC voltage in dependency of the lamp voltage, since the lamp voltage increases when the lamp ages.

In a second preferred embodiment of a circuit arrangement according to the invention, the control circuit comprises a first circuit part for generating a signal Scorr that represents the peak amplitude of the overshoot voltage across the output capacitor, a second circuit part for modulating the reference signal Sref at a modulation frequency that equals the frequency of the commutation of the DC current by subsequently decreasing the reference signal Sref by an amount ΔSref during a first time interval Δt1 that starts a second time interval Δt2 before each commutation of the DC current, maintaining the reference signal at the decreased value during a third time interval Δt3, increasing the reference signal Sref by an amount ΔSref during a fourth time interval Δt4, a third circuit part for adjusting at least one parameter chosen from the group formed by ΔSref, Δt1, Δt2, Δt3 and Δt4 so that the amplitude of the signal Scorr is minimal.

The third circuit part in this second preferred embodiment allows a very precise control of one or more of the dip parameters resulting in a very effective suppression of the overshoot voltage. The adjusting of the one or more dip parameters is preferably done by means comprised in the third circuit part for increasing and decreasing the value of the parameter until the amplitude of the signal Scorr is minimal. Although the adjustment of only one of the parameters until the amplitude of Scorr is minimal effects a certain suppression of the overshoot voltage, it is preferred that the third circuit part comprises means for adjusting at least 2 parameters chosen from the group formed by ΔSref, Δt1, Δt2, Δt3 and Δt4 so that the amplitude of the signal Scorr is minimal.

Good results have been obtained for embodiments, wherein the third circuit part comprises means for adjusting the parameters ΔSref, Δt2 and Δt3 so that the amplitude of the signal Scorr is minimal. The adjustment of the parameters is preferably effected by means of a microcontroller.

Figure 2:
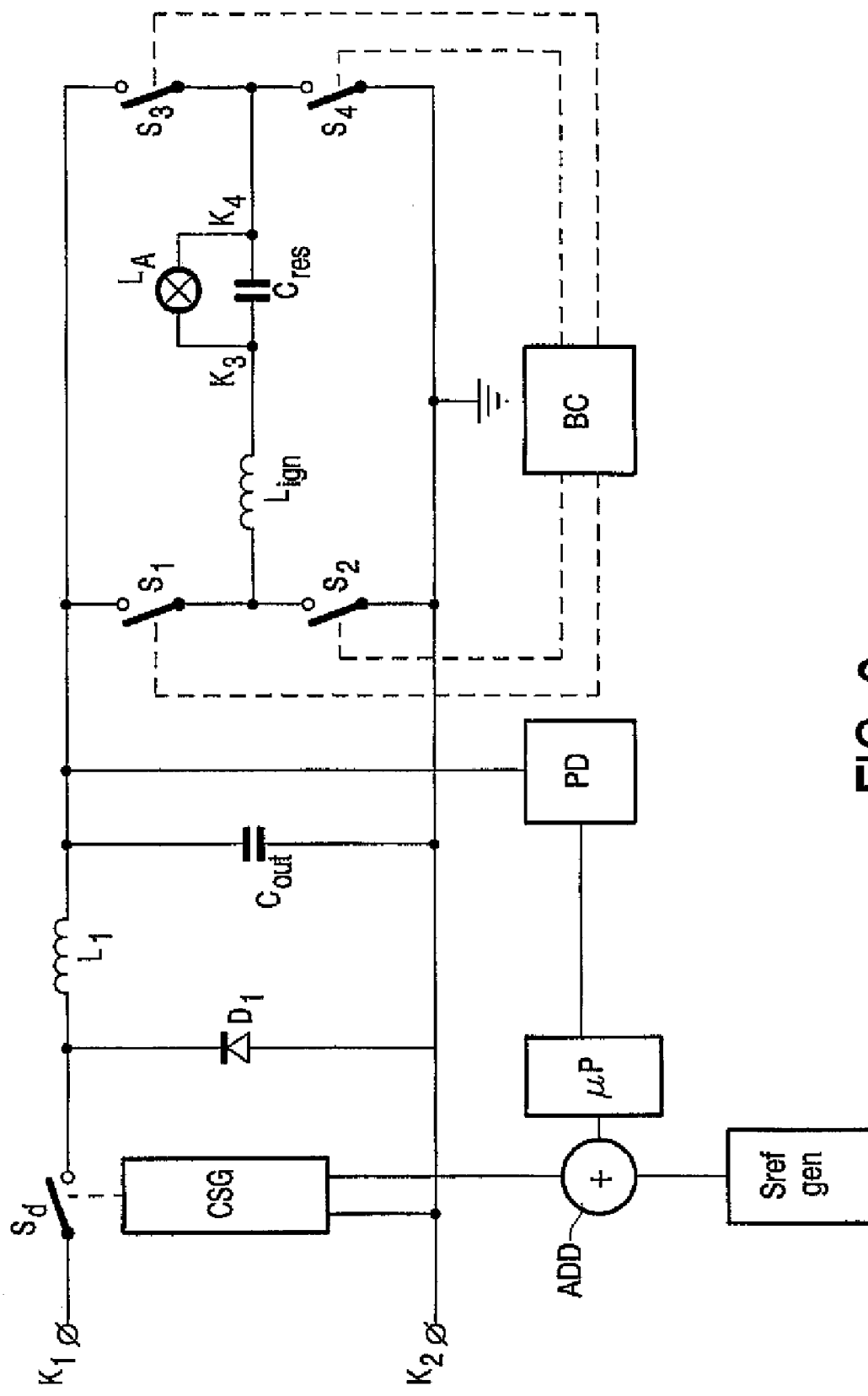
Figure 3:
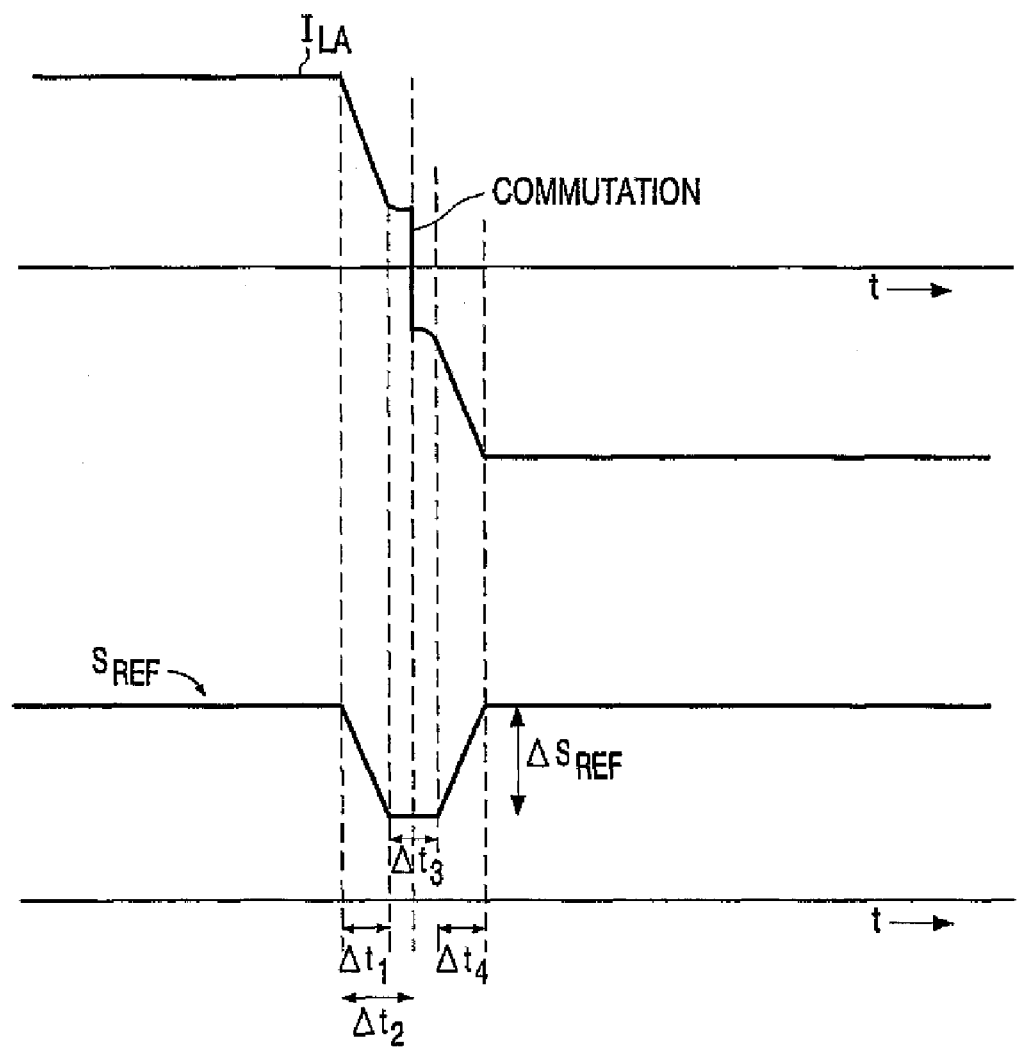

Embodiments of a circuit arrangement according to the invention will be explained making reference to a drawing. In the drawing FIG. 1 shows a first embodiment of a circuit arrangement according to the invention, with a lamp connected to it;

FIG. 2 shows a second embodiment of a circuit arrangement according to the invention with a lamp connected to it, and FIG. 3 shows the shape of the modulated signal Sref and the current through the lamp in the second embodiment as a function of time.

In FIG. 1, K1 and K2 are input terminals for connection to a supply voltage source. Input terminals K1 and K2 are connected by means of a series arrangement of a switching element Sd, an inductive element L1, an output capacitor Cout and an ohmic resistor R3. A common terminal of output capacitor Cout and ohmic resistor R3 is connected to a common terminal of switching element Sd and inductor L1 by means of a diode D1. CSG is a circuit part for generating a control signal for alternately rendering switching element Sd conductive and non-conductive. An output terminal of circuit part CSG is coupled to a control electrode of switching element Sd. A first input terminal of circuit part CSG is coupled to input terminal K2. A second input terminal of circuit part CSG is connected to an output terminal of circuit part ADD. Circuit part ADD is a circuit part for generating at its output terminal a signal that is the sum of a first signal present at a first input terminal of circuit part ADD and a second signal present at a second input terminal of circuit part ADD. The first input terminal of circuit part ADD is connected to an output terminal of circuit part Srefgen. Circuit part Srefgen is a circuit part for generating a reference signal Sref. Output capacitor Cout is shunted by a series arrangement of capacitors C1 and C2. A common terminal of capacitors C1 and C2 is connected to a first input terminal of operational amplifier AMP by means of an ohmic resistor R1. A second input terminal of operational amplifier AMP is connected to ground potential. An output terminal of operational amplifier AMP is connected to the first input terminal of operational amplifier AMP by means of an ohmic resistor R2. The output terminal of operational amplifier AMP is also directly connected to the second input terminal of circuit part ADD. The operational amplifier AMP and ohmic resistors R1 and R2 together form an amplifier. Switching element Sd, circuit part CSG, inductive element L1, output capacitor Cout, capacitors C1 and C2, diode D1, ohmic resistor R3, the amplifier, circuit part Srefgen and circuit part ADD together form a DC-DC-converter for generating a DC current out of a supply voltage supplied by the supply voltage source. In the embodiment shown in FIG. 1 this DC-DC-converter is of the down-converter type. Circuit part Srefgen, ohmic resistor R3 and part of the contents of circuit part CSG together form a control loop for controlling the DC current at a value that is represented by the reference signal Sref. Capacitors C1 and C2, the amplifier and circuit part ADD together form a control circuit for adjusting the reference signal Sref. Capacitors C1 and C2, the amplifier and circuit part ADD together also form means for adjusting the reference signal in dependency of the amplitude of an AC voltage that is present across the output capacitor and is caused by the commutation of the DC current. Capacitors C1 and C2 and the amplifier together form circuitry for generating a signal Scorr that represents the amplitude of the AC voltage over the output capacitor Cout. The amplifier is layed out in such a way that the signal (−Scorr) present at its output is proportional to the momentary amplitude of the AC voltage that is present across the output capacitor Cout but has a polarity that is opposite to the polarity of the AC voltage. For this reason the circuit part ADD generates at its output terminal a signal that equals Sref−Scorr. Therefor the amplifier together with the circuit part ADD forms circuitry for subtracting the signal Scorr from the reference signal Sref.

Output capacitor Cout is shunted by a series arrangement of switching element S1 and switching element S2 and also by a series arrangement of switching element S3 and switching element S4. A common terminal of switching element S1 and switching element S2 is connected to a common terminal of switching element S3 and switching element S4 by means of a series arrangement of ignition inductor Lign and capacitor Cres. Capacitor Cres is shunted by an ultra high pressure discharge lamp LA connected to lamp connection terminals K3 and K4 present at respective sides of capacitor Cres. The lamp LA can for instance be a high pressure lamp or an ultra high pressure lamp such as used in beamers and projection television. Control electrodes of the switching elements S1-S4 are coupled to respective output terminals of a circuit part BC for generating control signals for controlling the conductive state of switching elements S1-S4. In FIG. 1 this coupling is indicated by means of dotted lines. Switching elements S1-S4, circuit part BC, ignition inductor Lign, lamp terminals K3 and K4 and capacitor Cres together form a commutator for commutating the DC current generated by the DC-DC-converter.

The operation of the circuit arrangement shown in FIG. 1 is as follows.

When the input terminals K1 and K2 are connected to a supply voltage source that in case of the embodiment shown in FIG. 1 supplies a DC supply voltage, the circuit part CSG generates a control signal that renders the switching element Sd alternately conductive and non-conductive at a high frequency, for instance 100 kHz. As a result a DC voltage with a lower amplitude than the DC supply voltage is present over the output capacitor Cout, while a DC current is supplied to the commutator. The circuit part BC controls the switches S1-S4 alternately in two different states. In the first state the switching elements S1 and S4 are conductive and the switching elements S2 and S3 are non-conductive. In the second state the switching elements S2 and S3 are conductive and the switching elements S1 and S4 are non-conductive.

When the lamp has not yet ignited, the frequency at which the circuit part BC changes the conductive state of the switches S1-S4 is comparatively high, so that the ignition inductor resonates with the capacitor Cres. As a result a comparatively high voltage is present across capacitor Cres that ignites the lamp. After ignition of the lamp the frequency at which the circuit part BC changes the conductive state of the switches S1-S4 is comparatively low, for instance 90 Hz. As a result the lamp current is a low frequency substantially square wave shaped AC current. For a very short time lapse between the two states all the switching elements are maintained in the non-conductive state to prevent the switching elements that are part of the same series arrangement to be conductive at the same time and thereby forming a short circuit. During this very short time lapse the load of the DC-DC-converter is zero. Before and after this very short time lapse the load of the DC-DC-converter differs from zero. The abrupt change in the load taking place during commutation causes the output capacitor Cout and the lamp LA to resonate. When there is no resonance between the output capacitor Cout and the lamp LA and thus no AC voltage present across the output capacitor Cout, the signal at the second input terminal of circuit part ADD is approximately equal to zero. The signal present at the output terminal of circuit part ADD and also at the first input terminal of circuit part CSG therefore equals Sref. The voltage over ohmic resistor R3 represents the actual value of the DC current generated by the DC-DC-converter and is present at the second input terminal of circuit part CSG. A comparator comprised in circuit part CSG compares the signals present at the input terminals of the circuit part CSG and generates an error signal that influences the frequency and/or the duty cycle of the control signal generated by the circuit part CSG in such a way that the DC current is maintained at a value that corresponds to the value of the reference signal Sref. When the output capacitor Cout and the lamp LA resonate as a result of a commutation, an AC voltage is present across output capacitor Cout. Capacitors C1 and C2 together with the amplifier generate a signal Scorr that represents the momentary amplitude of the AC voltage that is present across the output capacitor Cout. As explained hereabove the amplifier is layed out in such a way that the signal (−Scorr) present at the second input terminal of circuit part ADD is proportional to the amplitude of the AC voltage across the output capacitor Cout but has a polarity that is opposite to the polarity of the AC voltage. As a consequence the signal present at the output of circuit part ADD equals Sref−Scorr. The value of the signal present at the first input terminal of circuit part CSG is thus decreased and as a result of that, the amplitude of the DC current generated by the DC-DC-converter is also decreased. As a consequence the resonance between the output capacitor Cout and the lamp LA is effectively suppressed. Since the extent to which the reference signal is changed (Scorr) is directly influenced by the momentary amplitude of the AC voltage across output capacitor Cout, the change in the reference signal is automatically adjusted for different lamp types to a value that corresponds to maximal resonance suppression. Similarly, when a lamp of a certain type ages, the change in the reference signal (Scorr) is also adjusted automatically to realize an effective suppression of the resonance during the whole life time of the lamp. A further improvement can be obtained by adjusting the ratio between the signal Scorr and the amplitude of the AC voltage in dependency of the age of the lamp. This can for instance be realized by incorporating a timer into the circuit and controlling the gain of the amplifier in dependency of the time lapse timed by the timer. It is simpler though, to incorporate in the circuit arrangement a circuit part for generating a signal that represents lamp voltage and decrease the gain of the amplifier when the lamp voltage increases or in other words when the lamp ages. This gain adjustment compensates for the change in the impedance of the lamp when it ages. It is further remarked that a filter could be incorporated into the circuit, coupled between the common terminal of capacitors C1 and C2 and the amplifier for passing the AC voltage caused by the resonance between the output capacitor Cout and the lamp LA from other AC voltages possibly present across the output capacitor, such as the voltage ripple caused by the switching of switching element Sd.

In FIG. 2, components and circuit parts that are similar to components and circuit parts of the circuit arrangement shown in FIG. 1 are labeled in the same way. The topology of the circuit arrangement shown in FIG. 2 differs from that of the circuit arrangement in FIG. 1 in that the amplifier formed by the operational amplifier AMP and the ohmic resistors R1 and R2 has been replaced by a microprocessor μP. Additionally the capacitors C1 and C2 have been replaced by a circuit part PD. Circuit part PD is peak detector. An input terminal of circuit part PD is connected to a common terminal of output capacitor Cout and inductive element L1. An output terminal of the circuit part PD is coupled to an input terminal of microprocessor μP. An output terminal of microprocessor μP is coupled to the second input terminal of circuit part ADD. The microprocessor μP together with circuit part ADD forms a second circuit part for modulating the reference signal Sref at a modulation frequency that equals the frequency of the commutation of the DC current by subsequently decreasing the reference signal Sref by an amount ΔSref during a first time interval Δt1 that starts a second time interval Δt2 before each commutation of the DC current, maintaining the reference signal at the decreased value during a third time interval Δt3, and increasing the reference signal Sref by an amount ΔSref during a fourth time interval Δt4. The moment in time referred to as commutation is the end of the commutation process, or in other words the moment in time in which two bridge switching elements have been rendered conductive directly after all four switching elements of the bridge circuit have been maintained in a non-conductive state for a short time lapse.

The microprocessor μP also forms a third circuit part for adjusting at least one parameter chosen from the group formed by ΔSref, Δt1, Δt2, Δt3 and Δt4 so that the amplitude of the signal Scorr is minimal. In the embodiment shown in FIG. 2 the microprocessor comprises means for adjusting the parameters ΔSref, Δt2 and Δt3 so that the amplitude of the signal Scorr is minimal.

The operation of the circuit arrangement shown in FIG. 2 is as follows.

During stationary operation of the circuit arrangement the DC-DC-converter and the commutator operate in the same way as in the circuit arrangement shown in FIG. 1. The peak detector PD comprised in the circuit arrangement in FIG. 2 generates a signal Scorr that represents the peak amplitude of the overshoot voltage over the output capacitor Cout. The peak detector can for instance comprise a circuit that samples the voltage present at the input terminal of the circuit part PD a number of times during and after the commutation process and subsequently selects the highest value of the sampled voltages. The value of the signal Scorr is found by subtracting the amplitude of the DC voltage, that is present across the across output capacitor during the major part of each half period of the lamp current, from the highest value of the sampled voltages. This subtracting is done by another circuit comprised in the circuit part PD. The microprocessor µP generates a modulation signal and together with the circuit part ADD modulates the reference signal Sref with a frequency that equals the commutation frequency by subsequently decreasing the reference signal Sref by an amount $\Delta$Sref during a first time interval $\Delta$t1 that starts a second time interval $\Delta$t2 before each commutation of the DC current, maintaining the reference signal at the decreased value during a third time interval $\Delta$t3, and increasing the reference signal Sref by an amount $\Delta$Sref during a fourth time interval $\Delta$t4. The resulting shape of the modulated reference signal is shown in FIG. 3. It can be seen that the value of Sref is constant most of the time but the modulation results in a periodical temporary decrease of the reference signal Sref. These periodical decreases start at a time interval $\Delta$t2 before commutation and have a shape that is determined by the parameters $\Delta$Sref, $\Delta$t1, $\Delta$t3 and $\Delta$t4. During the commutation process the following events take place. First, the two conductive switching elements of the bridge circuit are rendered non-conductive. Subsequently all four switching elements are maintained in a non-conductive state during a short time lapse and the other two switching elements are rendered conductive. The moment in time labelled "commutation" in FIG. 3 is the moment at which two switches of the bridge circuit have become conductive again (in other words the end of the commutation process). FIG. 3 also shows the shape of the lamp current as a function of time. The lamp current has a constant amplitude most of the time. A time lapse $\Delta$t2 before each commutation the amplitude decreases during the time interval $\Delta$t1. The amplitude of the lamp current is then maintained at a constant value during the time interval $\Delta$t3. In the example in FIG. 3 the moment in time labelled "commutation" is in the course of the time interval $\Delta$t3. After the time interval $\Delta$t3 the amplitude of the lamp current increases back to its original value during the time interval $\Delta$t4. It is noteworthy that $\Delta$t1 is not necessarily equal to $\Delta$t4 and that the moment in time labelled "commutation" is not necessarily precisely situated in the middle of the time interval $\Delta$t3 but may at another time depending on for instance the value of $\Delta$t2.

During operation of the circuit arrangement, the microprocessor adjusts the values of the parameters $\Delta$Sref, $\Delta$t2 and $\Delta$t3 continuously in the following way. The value of the signal Scorr is saved in a memory. Subsequently parameter $\Delta$Sref is increased by a predetermined amount and the value of the signal Scorr after the increase of $\Delta$Sref is compared with the value before the increase that was saved in the memory. In case the signal Scorr is decreased as a result of the increase of $\Delta$Sref, the new value of Scorr is saved in the memory by overwriting the previous value and $\Delta$Sref is increased once more by the predetermined amount. This procedure is repeated until an increase in $\Delta$Sref causes the signal Scorr to increase. In the latter case $\Delta$Sref is decreased by the predetermined amount and the resulting value of Scorr is saved in the memory by overwriting the previous value. In case the first increase of $\Delta$Sref causes an increase in the signal Scorr the microprocessor decreases the value $\Delta$Sref until a further decrease causes an increase in the signal Scorr. The signal Scorr is thus minimalized by adjusting the parameter $\Delta$Sref. The microprocessor subsequently increases and decreases the parameter $\Delta$t2 until a minimal value of the signal Scorr results, in the same way as outlined hereabove for the parameter $\Delta$Sref. After the adjustment of parameter $\Delta$t2, parameter $\Delta$t3 is adjusted at a value corresponding to a minimal value of the signal Scorr. After the adjustment of parameter $\Delta$t3 the microprocessor subsequently adjusts $\Delta$Sref, $\Delta$t2 and $\Delta$t3 again etc. Because of the continuous adjustment of the parameters $\Delta$Sref, $\Delta$t2 and $\Delta$t3 the modulation of the reference signal Sref is continuously and automatically adapted to different lamps that are operated by means of the circuit arrangement. Similarly the changes in lamp properties with life time are continuously and automatically accounted for. As a result a maximal suppression of overshoot voltage is obtained for many different lamp types during their whole life time. Since the parameters determining the shape of the modulation of the reference signal Sref can be adjusted independently from each other, the shape of the modulation can be changed in many different ways resulting in practice in a very effective suppression of the overshoot voltage.

Merely by way of example the functioning of the circuit arrangement shown in FIG. 2 was described for an embodiment in which the parameters $\Delta$Sref, $\Delta$t2 and $\Delta$t3 are adjusted. Of course it is possible to let the microprocessor adjust all 5 parameters or otherwise less than 3 parameters. Adjustment of more parameters will generally lead to a better suppression of the overshoot voltage.

The invention claimed is:

1. Circuit arrangement for operating a high pressure discharge lamp comprising
    input terminals for connection to a supply voltage source,
    a DC-DC-converter coupled to the input terminals for generating a DC current out of a supply voltage supplied by the supply voltage source, including a control loop for controlling the DC current at a value that is represented by a reference signal Sref, a control circuit for adjusting the reference signal Sref, and an output capacitor, and
    a commutator for commutating the DC current and comprising lamp connection terminals,
    wherein the control circuit comprises means for adjusting the reference signal Sref in dependency of the amplitude of a periodical voltage that is present across the output capacitor and is caused by the commutation of the DC current.

2. Circuit arrangement according to claim 1, wherein the control circuit comprises circuitry for generating a signal Scorr that represents the momentary amplitude of an AC voltage across the output capacitor and circuitry for subtracting the signal Scorr from the reference signal Sref.

3. Circuit arrangement according to claim 2, wherein the signal Scorr is proportional to the momentary amplitude of the AC voltage across the output capacitor.

4. Circuit arrangement according to claim 3, wherein the circuit arrangement is equipped with circuitry for adjusting the ratio between the signal Scorr and the momentary amplitude of the AC voltage across the output capacitor in dependency of the age of the lamp.

5. Circuit arrangement according to claim 4, wherein the circuit arrangement is equipped with circuitry for adjusting the ratio between the signal Scorr and the momentary amplitude of the AC voltage across the output capacitor in dependency of the lamp voltage.

6. Circuit arrangement according to claim 1, wherein the control circuit comprises a first circuit part for generating a signal Scorr that represents the peak amplitude of the overshoot voltage across the output capacitor, a second circuit part for modulating the reference signal Sref at a modulation frequency that equals the frequency of the commutation of the DC current by subsequently decreasing the reference signal Sref by an amount $\Delta$Sref during a first time interval $\Delta t1$ that starts a second time interval $\Delta t2$ before each commutation of the DC current, maintaining the reference signal at the decreased value during a third time interval $\Delta t3$, and increasing the reference signal Sref by an amount $\Delta$Sref during a fourth time interval $\Delta t4$, and a third circuit part for adjusting at least one parameter chosen from the group formed by $\Delta$Sref, $\Delta t1$, $\Delta t2$, $\Delta t3$ and $\Delta t4$ so that the amplitude of the signal Scorr is minimal.

7. Circuit arrangement according to claim 6, wherein the third circuit part comprises means for increasing and decreasing the value of the parameter until the amplitude of the signal Scorr is minimal.

8. Circuit arrangement according to claim 6, wherein the third circuit part comprises means for adjusting at least 2 parameters chosen from the group formed by $\Delta$Sref, $\Delta t1$, $\Delta t2$, $\Delta t3$ and $\Delta t4$ so that the amplitude of the signal Scorr is minimal.

9. Circuit arrangement according to claim 8, wherein the third circuit part comprises means for adjusting the parameters $\Delta$Sref, $\Delta t2$ and $\Delta t3$ so that the amplitude of the signal Scorr is minimal.

10. Circuit arrangement according to claims 6, wherein the third circuit part comprises a microcontroller.

* * * * *